(12) United States Patent
Lafferty

(10) Patent No.: US 8,683,931 B1
(45) Date of Patent: Apr. 1, 2014

(54) SEED METERING DOOR OPERATION

(76) Inventor: James G. Lafferty, Fredericksburg, VA (US)

( * ) Notice: Subject to any disclaimer, the term of this patent is extended or adjusted under 35 U.S.C. 154(b) by 343 days.

(21) Appl. No.: 12/929,685

(22) Filed: Feb. 8, 2011

Related U.S. Application Data

(60) Provisional application No. 61/337,728, filed on Feb. 8, 2010.

(51) Int. Cl.
  *G06F 17/00* (2006.01)
  *A01C 7/08* (2006.01)

(52) U.S. Cl.
  USPC .............................. 111/200; 111/900; 701/50

(58) Field of Classification Search
  USPC ........ 111/200, 130, 14, 900; 700/240; 701/50
  See application file for complete search history.

(56) References Cited

U.S. PATENT DOCUMENTS

| | | | |
|---|---|---|---|
| 612,043 A | 10/1898 | King | |
| 1,134,894 A | 4/1915 | Nurton | |
| 1,840,602 A | 1/1932 | Pender | |
| 2,332,743 A | 10/1943 | Morris | |
| 2,661,124 A | 12/1953 | Ajero | |
| 2,854,933 A | 10/1958 | Kuester | |
| 3,027,180 A | 3/1962 | Schnell | |
| 3,053,418 A | 9/1962 | Jordan | |
| 3,101,826 A | 8/1963 | Jennings | |
| 3,106,998 A | 10/1963 | Walker | |
| 3,113,655 A | 12/1963 | Adler | |
| 3,163,333 A | 12/1964 | Berry | |
| 3,581,954 A * | 6/1971 | Prentice | ..................... 222/361 |
| 3,648,810 A | 3/1972 | Weatherby | |
| 3,982,670 A | 9/1976 | Brass | |
| 3,993,227 A | 11/1976 | Oettinger | |
| 4,122,974 A | 10/1978 | Harbert | |
| 4,137,853 A | 2/1979 | Peterson | |
| 4,289,256 A | 9/1981 | Bailey | |
| 4,359,952 A | 11/1982 | Gesior | |
| 4,373,621 A | 2/1983 | Hellmer | |
| 4,408,704 A | 10/1983 | Steilen | |
| 4,427,135 A | 1/1984 | Mackay | |
| 4,438,873 A | 3/1984 | Kaercher | |
| 4,516,670 A | 5/1985 | Sorensen | |
| 4,550,860 A | 11/1985 | Weeder | |
| 4,774,897 A | 10/1988 | Bailey | |
| 4,793,523 A | 12/1988 | Bailey | |
| 4,928,858 A | 5/1990 | Tite | |
| 2011/0098851 A1 * | 4/2011 | Glendenning et al. | ........ 700/240 |

\* cited by examiner

*Primary Examiner* — Christopher J Novosad
(74) *Attorney, Agent, or Firm* — James Creighton Wray

(57) ABSTRACT

Expensive seed wasting and crop stunting are avoided by electronically controlling solenoids to selective supply fluid pressure to double acting cylinders. Rams operate links and roller mounted seed doors. Extending or withdrawing the rams closes or opens the doors. Clips on the rams limit door openings. A microprocessor stores field dimensions and planting patterns, spacing of seed planting headers from an onboard GPS and distances of seed travel through spaced seed distribution tubes. The microprocessor electronically controls solenoids to timely shut seed doors in groups before reaching turns or unplanted headlands and to timely open groups of seed doors before reaching planting areas.

16 Claims, 16 Drawing Sheets

SEED METERING DOOR OPERATION

This application claims the benefit of U.S. Provisional Application No. 61/337,728, filed Feb. 8, 2010, which is hereby incorporated by reference in its entirety.

FIELD OF THE INVENTION

This invention provides seed metering door operation for preventing seed waste when turning, lifting or lowering multiple row air seeders.

SUMMARY OF THE INVENTION

Large bulk seed tanks are positioned above seed metering troughs. Openings in the troughs admit seed from the tank to pass into the seed meter. By each opening a rotating volumetric metering wheel dispenses seed into a venturi where seeds are moved through a flexible tube by pressurized air to a splitter Y, from which two tubes deliver seed to the seed opener boots in front and rear ranks.

Individual manually operated doors close to restrict the openings to block seeds from metering wheels for leaving unseeded rows as tram-lines The doors are fully opened to admit large seed such as soybeans, wheat, barley, oats, etc. or may be partially closed for seeding small seed such as rape, canola, etc. The seed meter wheel rotational relationship to distance traveled is adjustable by means of a transmission to obtain desired seeding rate.

Problems arise when lifting the seeder at headlands or point rows as seed is being metered during the raise cycle. This waisted seed will be distributed on top of the soil Seed cost continues to rise, and over-seeding or double planting causes inferior plants resulting in lower yields.

The purpose of this invention is to save seed and facilitate a better crop stand without double planting. This feat is accomplished preferably with the use of a GPS system. However a manual system could be used with a lesser degree of accuracy.

The TRAM-RITE gate system can be coupled with a GPS system to shut gates on pre-selected seed meters to eliminate double planting on point rows or to shut all gates when planter enters the head-lands. Tram-lines can also be incorporated into this system by means of a remote controller.

The invention prevents seed waste and scattering and provides seed stopping in selected groups of rows by closing seed doors and preventing seed wheels from feeding seeds to down tubes. When a turn has been completed or an area not to be planted has been crossed, the invention opens the seed doors to allow the seed wheels to resume delivering spaced seeds through the down tubes to the venturis. The seeds are blown along main tubes and through splitters to front rank and rear rank distribution tubes.

The main tubes and distribution tubes are long and are filled with moving spaced seeds. It is important that the seed doors are closed at precise times before the intended interruption of seeding so that the tubes will be empty when the intended seeding skip is reached.

The towing tractor or the towed planter has a GPS system and a microprocessor, which has field dimensions, which directs desired planting patterns, and which precisely locates the tractor and planter in the field.

The planter may be thirty feet or more wide, and the seed planting openers may be placed about forty feet behind the tractor and the tractor's GPS locator.

A software program in the onboard microprocessor calculates tractor speed and considers the time factor of the seed travel through the distribution system, so that the shutting and opening of the seed doors occurs precisely to prevent unintended seeding and to resume seeding at intended locations.

The invention has one-inch stroke air cylinders or other hydraulic or linear motor actuators that are supplied by valves and valve-operating solenoids controlled by the onboard microprocessor to open and close the seed doors at the precise times. The doors are closed and opened in groups.

Seed bins on planters have a large seed chamber with sloping bases leading to a triangular cross section trough which extends transversely across the planter. The front of the trough is a heavy plate with spaced rectangular ports throughout which seeds pass to measuring wheels. The measuring wheels are turned by a hexagonal shaft. Measuring wheels have regular radial teeth between seed holding recesses.

Double measuring wheels have teeth which are angularly offset in pairs to meter spaced seeds one by one into the down tubes and venturis.

The plate ports are closed or opened and can be partially closed, depending on seed types. Doors slide on the plate in a space provided by the mounts for the wheels and down tubes.

The invention avoids the multiple steps of stopping and manually closing and later opening seed doors, which are not taken when turning at the end of a field or passing over a road or water way, for example.

The present invention replaces the bolts which separately secure each wheel chamber and down tube assembly to the front plate by each port with longer bolts which hold legs of a bracket against adjacent wheel chamber and down tube assemblies and to the front plate. The legs underlie and further support sides of the wheel chamber and down tube assemblies.

The legs are welded to I beam guides for self-lubricating rollers which are mounted on a T welded to the door to insure easy translation of the door. Triangular brackets extend outward from the I beam guides.

A head of a double acting air cylinder is attached to a U shaped trunion mount, which is rotatable on the end of the brackets.

A second U shaped mount rotatable midway on the brackets supports a bell crank. The bell crank is connected at one end to a clevis on the end of the air cylinder ram. The second end of the bell crank is connected rotatable links connected to the T that is welded to a door. Pulling the ram inward opens the door. Pushing the ram outward closes the door.

Each door is operated by a similar structure with legs, brackets, U shaped rotatable mounts, a toggle link and rotatable links connected to a T welded to the door.

The tractor operator simply drives the tractor. The field pattern control microprocessor and GPS system mounted on the tractor are connected to solenoids which operate air valves that operate the double acting air cylinders.

To control partial opening of the seed doors for controlling different sizes of seeds, stops of a uniform selected length are manually spring clamped to the ram shafts to limit the pulling of the rams into the cylinders and thus to control the door opening travel.

These and further and other objects and features of the invention are apparent in the disclosure, which include the above and ongoing written specification, with the claims and the drawings.

DETAILED DESCRIPTION OF THE DRAWINGS

The invention prevents seed waste and scattering and provides seed stopping in selected groups of rows by closing seed doors and preventing seed wheels from feeding seeds to down tubes. When a turn has been completed or an area not to be planted has been crossed, the invention opens the seed doors to allow the seed wheels to resume delivering spaced seeds through the down tubes to the venturis. The seeds are blown along main tubes and through splitters to front rank and rear rank distribution tubes.

The main tubes and distribution tubes are long and are filled with moving spaced seeds. It is important that the seed doors are closed at precise times before the intended interruption of seeding so that the tubes will be empty when the intended seeding skip is reached.

Figure 1:
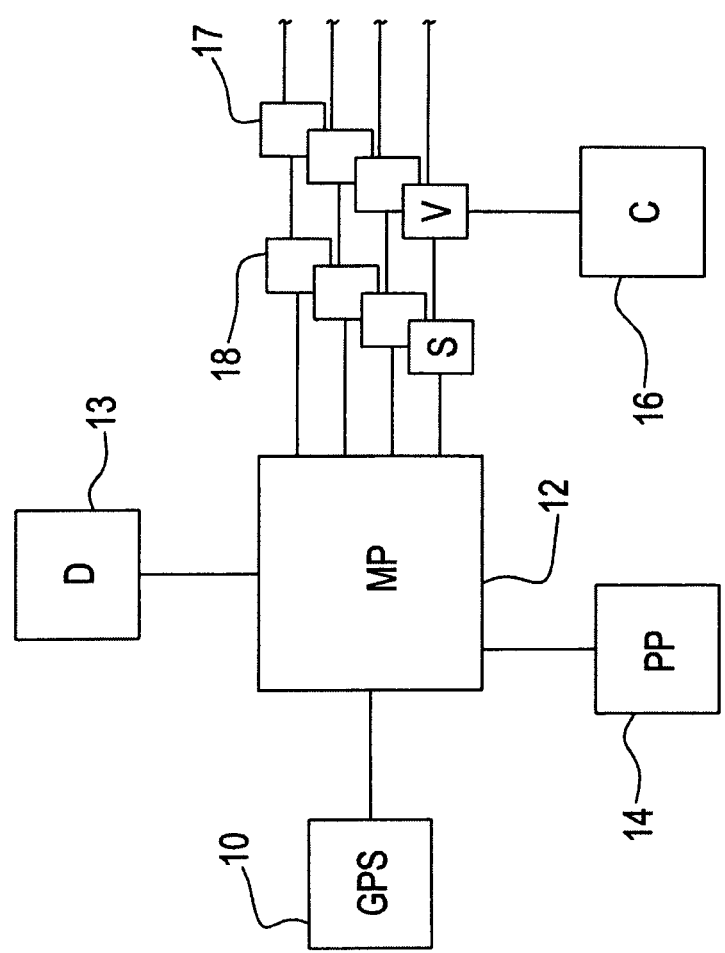
FIG. 1 is a schematic representation of a tractor GPS and microprocessor which operate solenoids and valves to operate valves which control the double acting air cylinders.

FIG. 1 is a schematic representation of a tractor GPS and microprocessor which operate solenoids and valves to operate valves which control the double acting air cylinders.

The towing tractor has a GPS system 10 that precisely locates the tractor in the field and a microprocessor 12, which has a field dimensions display 13, and which directs desired planting patterns 14.

The planter may be thirty feet or more wide, and the seed planting openers may be placed about forty feet behind the tractor and the GPS locator.

A software program in the onboard microprocessor 12 calculates tractor speed and considers the length of the main and distribution tubes and the distance of the planter heads behind the GPS locator 10, so that the shutting and opening of the seed doors occurs precisely to prevent unintended seeding and to resume seeding at intended locations.

The invention has air cylinders or other actuators that are supplied by valves 17 from compressor 16 and valve-operating solenoids 18 controlled by the onboard microprocessor 12 to open and close the seed doors at the precise times. The doors may be closed and opened in groups.

As shown in FIGS. 9-17 seed bins on planters have large seed chambers with sloping bases leading to a triangular cross section trough which extends transversely across the planter. The front of the trough is a heavy plate with spaced rectangular ports throughout which seeds pass to measuring wheels. The measuring wheels are turned by a hexagonal shaft. Measuring wheels have regular radial teeth between seed holding recesses.

Double measuring wheels have teeth which are angularly offset in pairs to meter spaced seeds one by one into the down tubes and venturis.

The plate ports are closed or opened and can be partially closed, depending on seed types.

The invention avoids the multiple steps which are not taken when turning at the end of a field or passing over a road or water way, for example.

Figure 2:
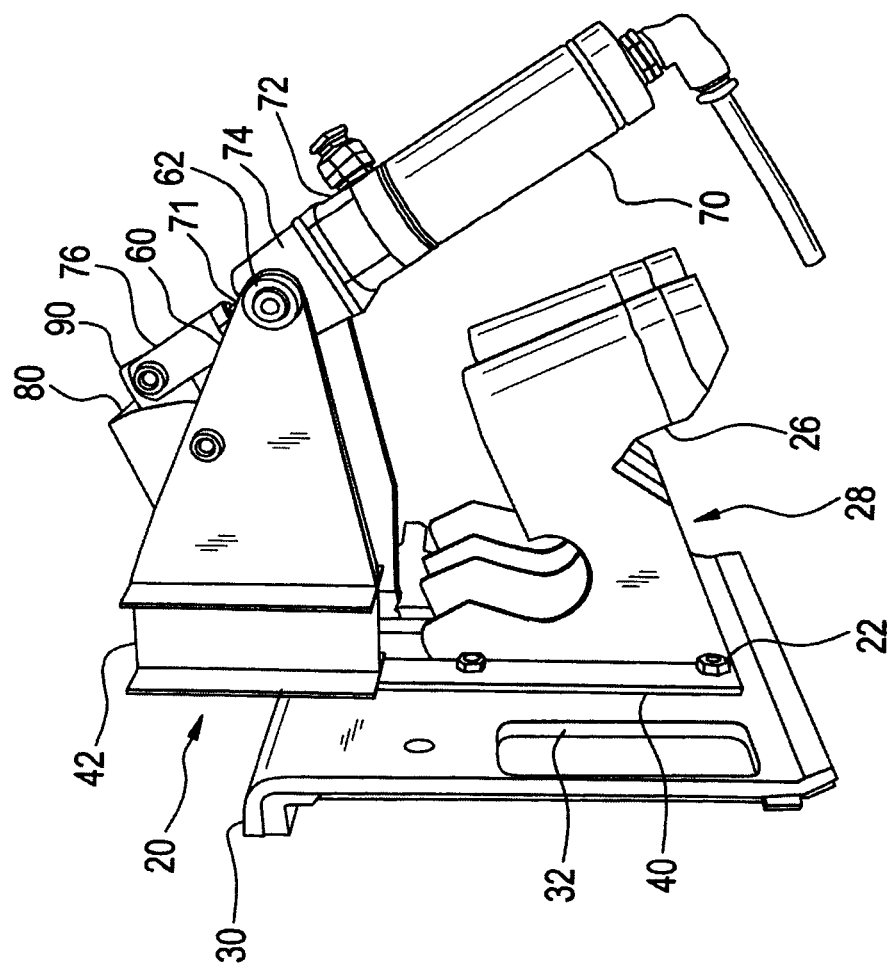
FIG. 2 shows the door opening system mounted on a transverse front panel showing legs, I beam roller guides, brackets, U shaped rotatable trunion supports and an air cylinder and ram.
Figure 3:
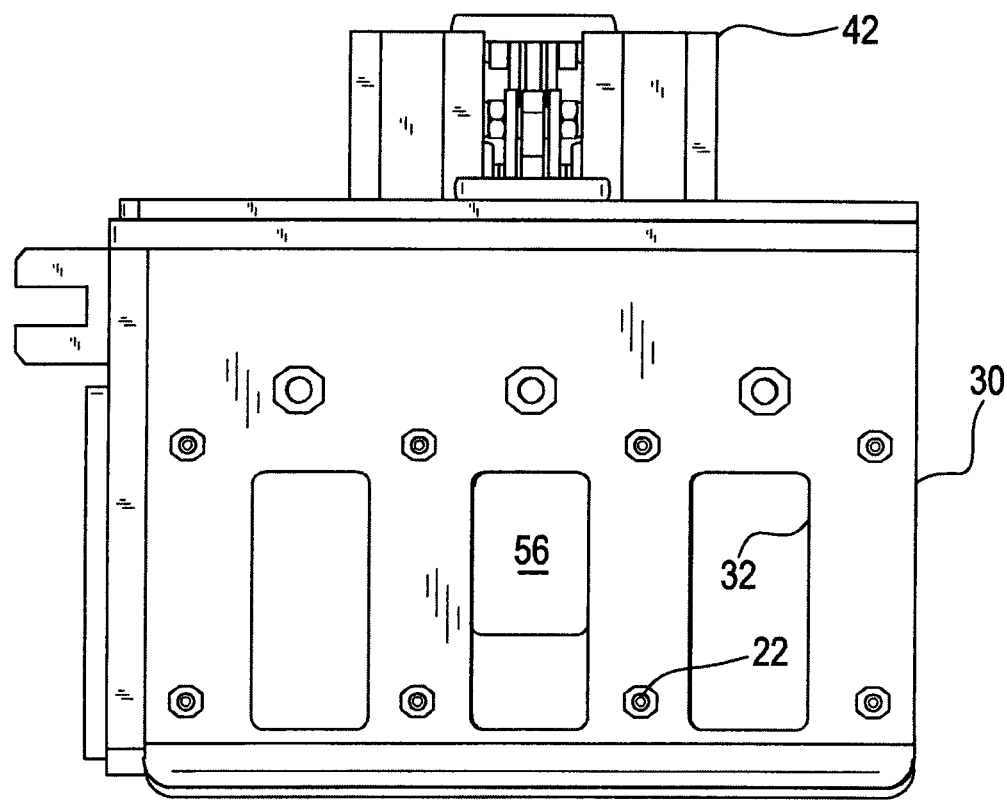
FIG. 3 is an inside view of the cut-off plate showing ports and a door. The threaded welded nut above the door is for detents to hold door positions, which are removed and not used in the present invention.
Figure 4:
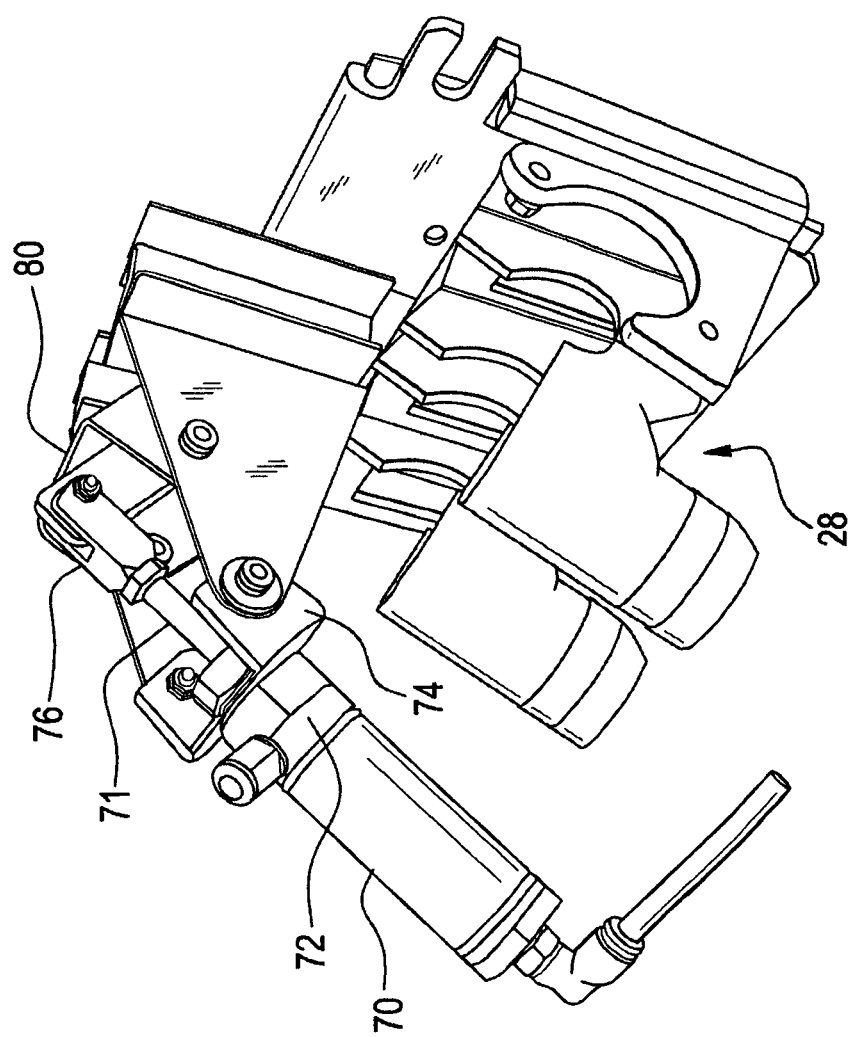
FIG. 4 is a front perspective view of the new system.
Figure 5:
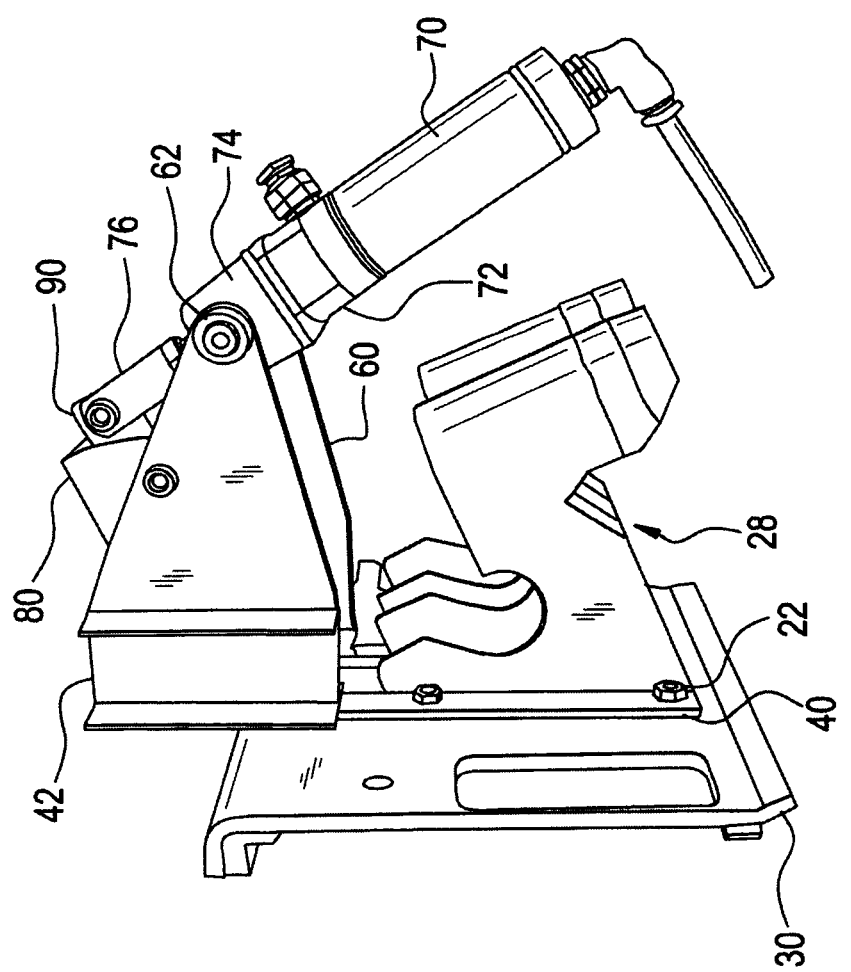
FIG. 5 is a side perspective view of the new system.
Figure 6:
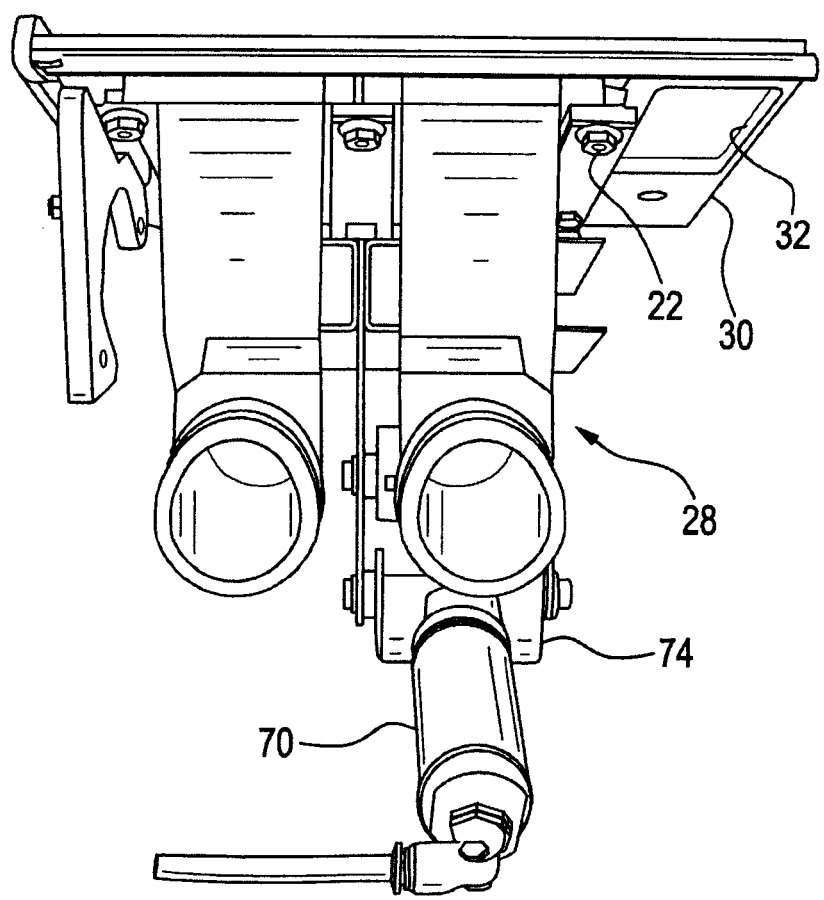
FIG. 6 is a bottom perspective view of the new system.

FIGS. 2-7 show one door opening system 20 mounted on a foreshortened heavy plate 30 with openings 23 that are closed by doors. FIG. 2 shows bracket legs 40, I beam roller guides 42, brackets 60, U shaped rotatable trunion support 74 and an air cylinder 70 and ram 71.

The present invention replaces the bolts which separately secure each wheel guide channel 24 and down tube 26 assembly 28 to the front plate 30 by each port 32 with longer bolts 22 which hold legs 40 of a bracket against adjacent wheel chamber and down tube assemblies and to the front plate. The legs underlie and further support sides of the wheel channel and down tube assemblies 28 (FIG. 7).

The legs 40 are welded to I beam guides 42 for self-lubricating rollers 50 (FIG. 7) which are mounted on a T 52 welded to the door 56 (FIG. 3) to insure easy translation of the door. Triangular brackets 60 extend outward from the I beam guides 42.

A head 72 of a double acting air cylinder 70 is attached to a U shaped trunion mount 74, which is rotatable on the ends 62 of the brackets 60.

Figure 7:
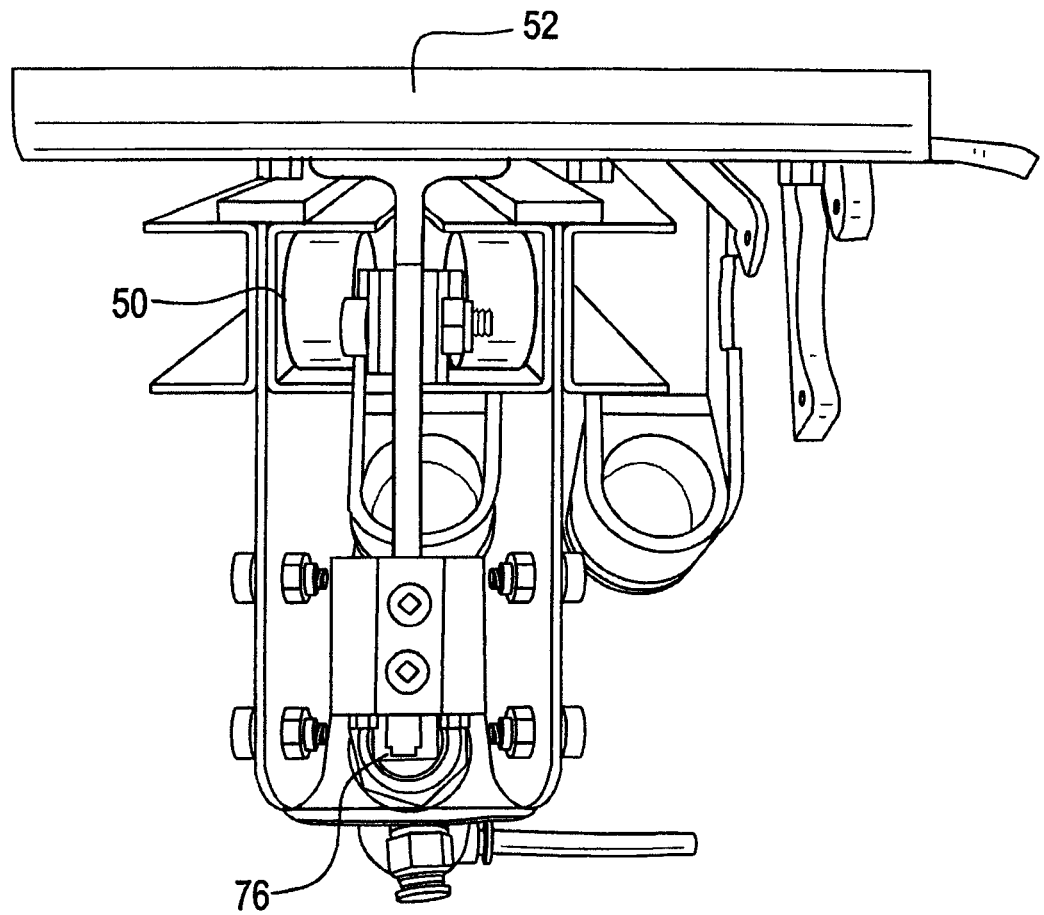
FIG. 7 is a top view of the new system.

A second U shaped mount 80, rotatable midway on the brackets, supports a bell crank lever or toggle link 90 (FIG. 7). The bell crank lever is connected at one end to a clevis 76 on the end of the air cylinder ram 71. The second end of the toggle link 90 is connected rotatable links 92 connected to the T 52 that is welded to a door 56. Pulling the ram 71 inward opens the door. Pushing the ram outward closes the door.

Each door is operated by a similar structure with legs, brackets, U shaped rotatable mounts, a toggle link and rotatable links connected to a T welded to the door.

The tractor operator simply drives the tractor. The field pattern control microprocessor and GPS system mounted on the tractor or the planter are connected to solenoids which operate air valves that operate the double acting air cylinders.

Figure 8:
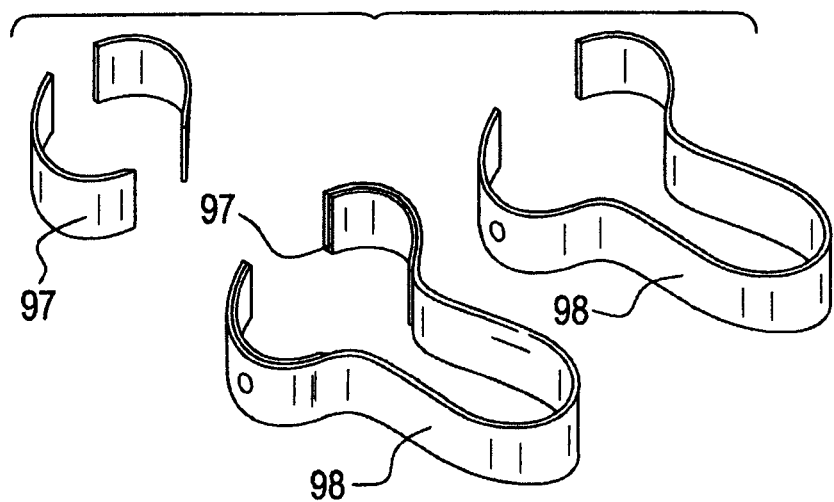
FIG. 8 is a detail of a collar stop for mounting on the extended ram shaft of the air cylinder to restrict inward movement of the ram to control size of the door opening for smaller seeds.

To control partial opening of the seed doors for controlling different sizes of seeds, stops 97 of a uniform selected length are manually spring clamped 98 (FIG. 8) to the ram shafts to limit the pulling of the rams into the cylinders and thus to control the door opening travel.

Figure 9:
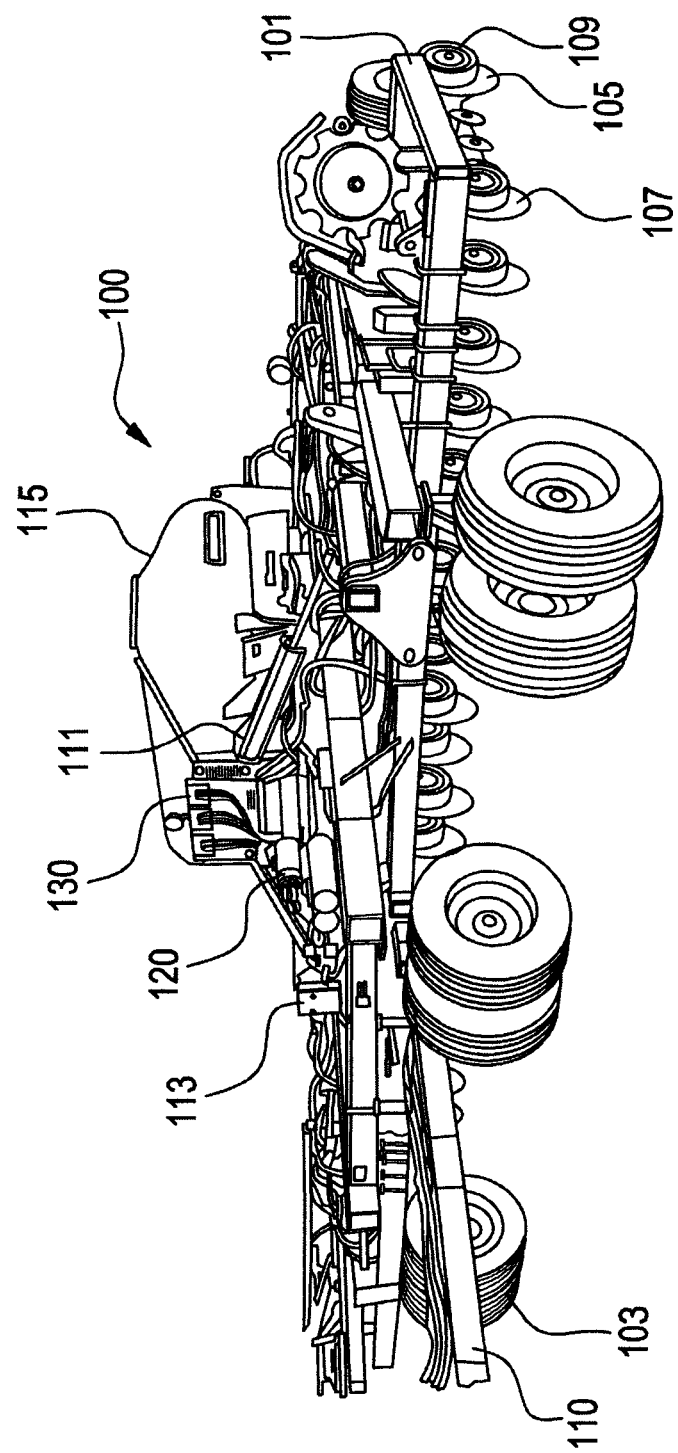
FIG. 9 is a perspective view showing the front and side of a planter.

FIG. 9 is a perspective view showing the front and side of a planter. The planter 100 has a frame 101 mounted on wheels 103 and carrying seed planter discs 105 in front and rear ranks 107, 109. A draw bar 110 tows the planter behind a tractor. Folding cylinder rams 111 lift outer sections of the planter for transport. A GPS box 113 locates the planter. A seed hopper 115 provides seed through seed doors to seed meters and then to distribution tubes.

Low pressure high volume air moves the spaced seeds through the distribution tubes. Y dividers in the distribution tubes supply the front and rear planter discs.

When it is necessary to temporarily stop seed flow through the seed meters and distribution tubes, seed doors from the hopper are closed at precise times and then opened at precise times.

High pressure, low volume air from air compressor 120 is delivered to solenoid operated valves in the door control boxes 130 mounted at the front of the seed hopper 105. The solenoid operated valves control application of the high pressure air to opposite ends of the air cylinders to open or close the seed doors.

Figure 10:
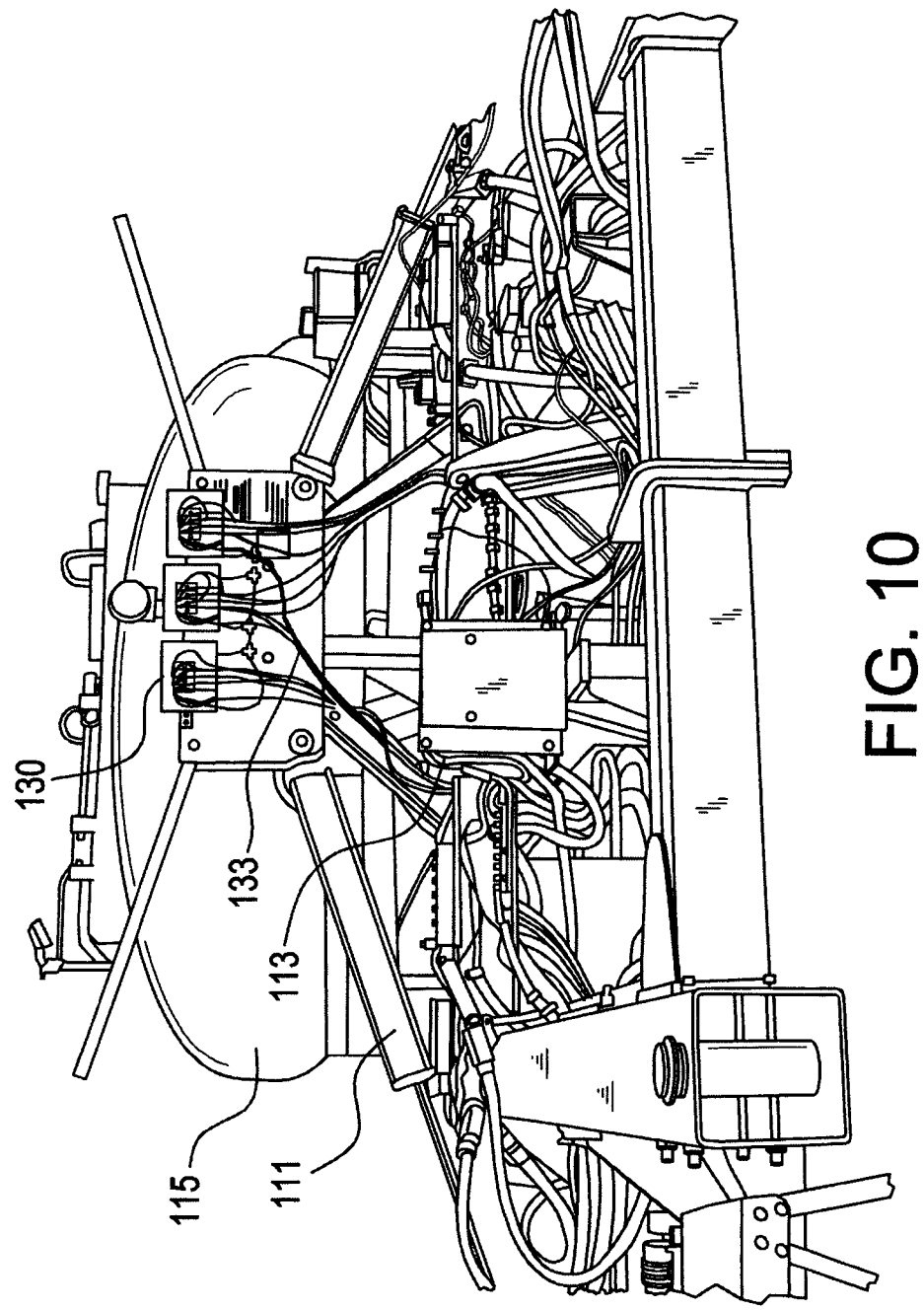
FIG. 10 is an enlarged view of FIG. 9 showing air control valve boxes for the seed metering doors.

FIG. 10 is an enlarged view of FIG. 9 showing the air control valve boxes for supplying high pressure air selectively to opposite ends of the air cylinders to open or close the seed metering doors. The GPS box 113 is shown in the foreground. Seed door control valve boxes 130 are mounted in front of the seed hopper 105.

Figure 11:
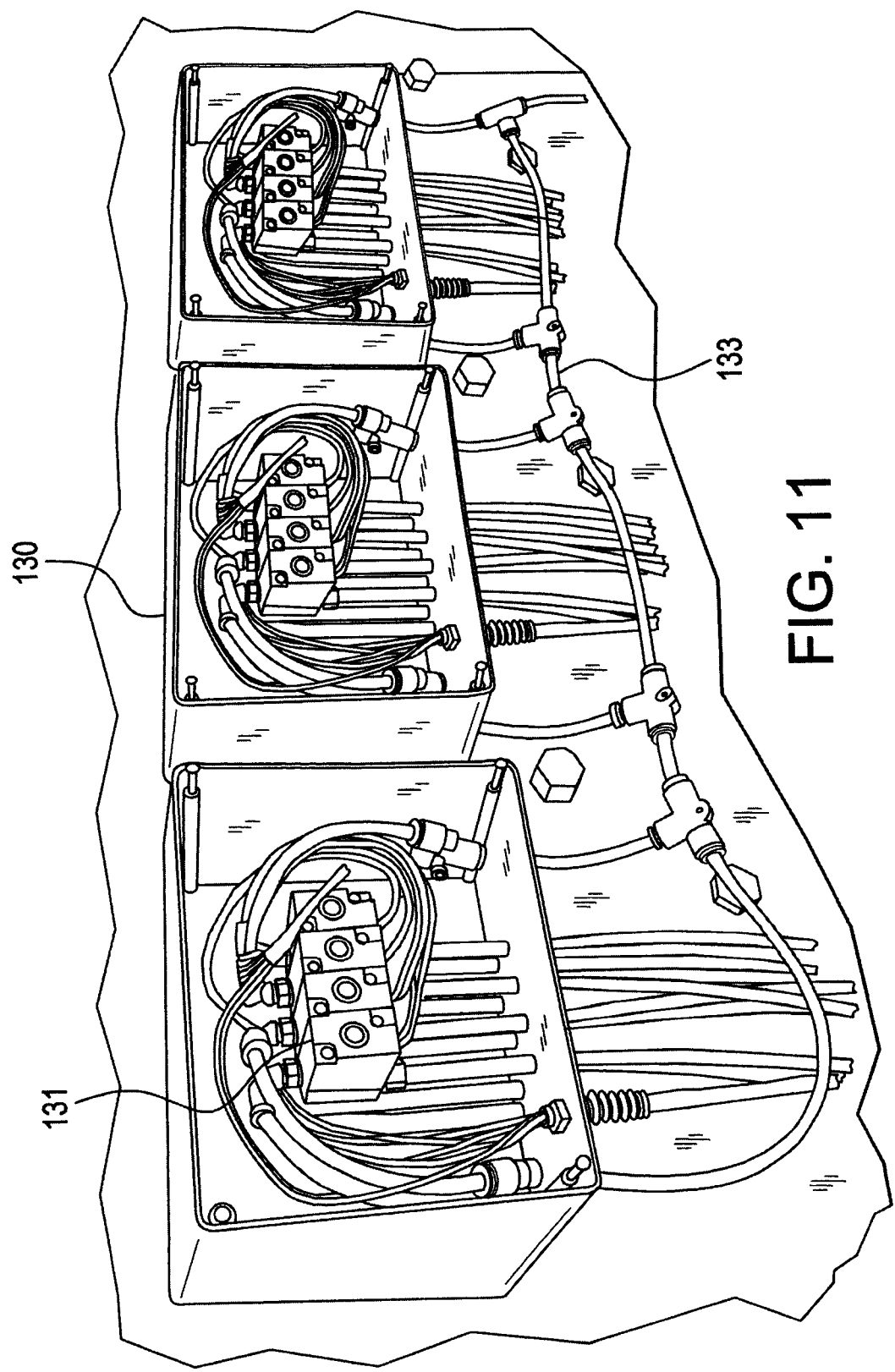
FIG. 11 is an enlarged view of FIG. 10 showing the air control valve boxes.

FIG. 11 is an enlarged view of FIG. 10 showing the control boxes. Each valve box 130 contains four valves 131. High pressure lines 133 from compressor 120 supply high pressure air to the valves. Each valve 131 supplies pressure through line 135 or 137 to air cylinders to open or close seed doors. Electric solenoids control positions of the valves. The solenoids are connected through electric lines to the GPS box 103.

Figure 12:
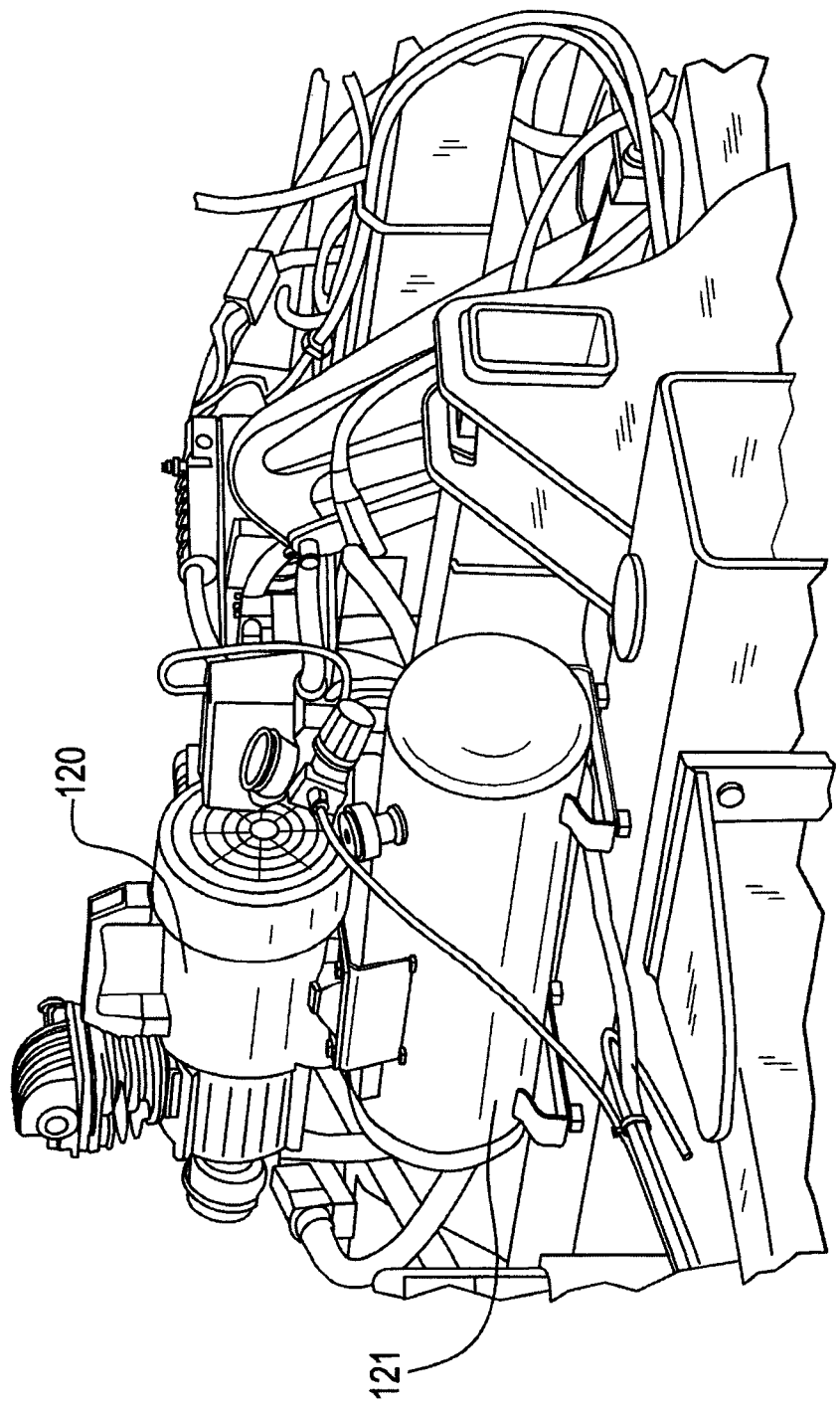
FIG. 12 is an enlarged view of the air compressor for supplying the air control valve boxes.

FIG. 12 is an enlarged view of the air compressor for supplying the control boxes. FIG. 12 shows compressor 120 and high pressure tank 121 to supply high pressure air to the control valves 131.

Figure 13:
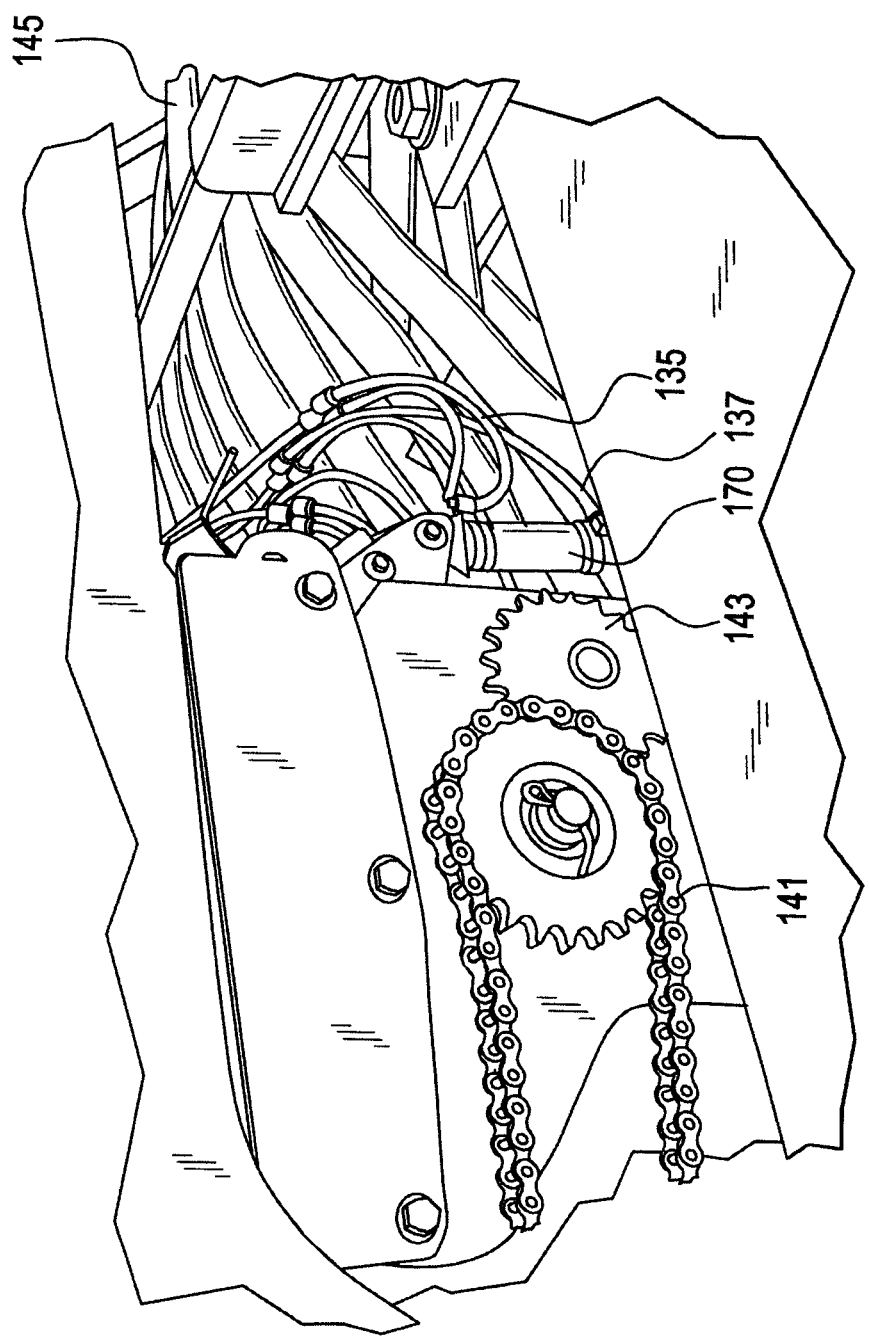
FIG. 13 is a side perspective view of the seed metering drive train partially showing seed distribution tubes and the air tubes and drive cylinders for the seed metering doors.

FIG. 13 is a perspective view of the seed metering drive train partially showing seed distribution tubes and the air tubes and drive cylinders for the seed metering doors. Chain 141 and gears 143 drive the seed meter sprag clutches to rotate the seed meter shafts in step. Seed distribution tubes 145 extend from the seed meters to distribute seeds to Y divider tubes and to the planter discs.

Air cylinders 70 are served by lines 135 and 137 to open seed doors from the seed hopper to the seed meters when air is supplied to lines 135 and to close the doors when air is supplied to lines 137. Supplying air to lines 135 pulls the piston rods 71 into the cylinders to open the doors. Placing collars on the piston rods limits downward travel of the rod and thereby limits opening of the seed doors for smaller seeds, for example canola and rape seeds. In case of air loss the doors remain in open position.

Figure 14:
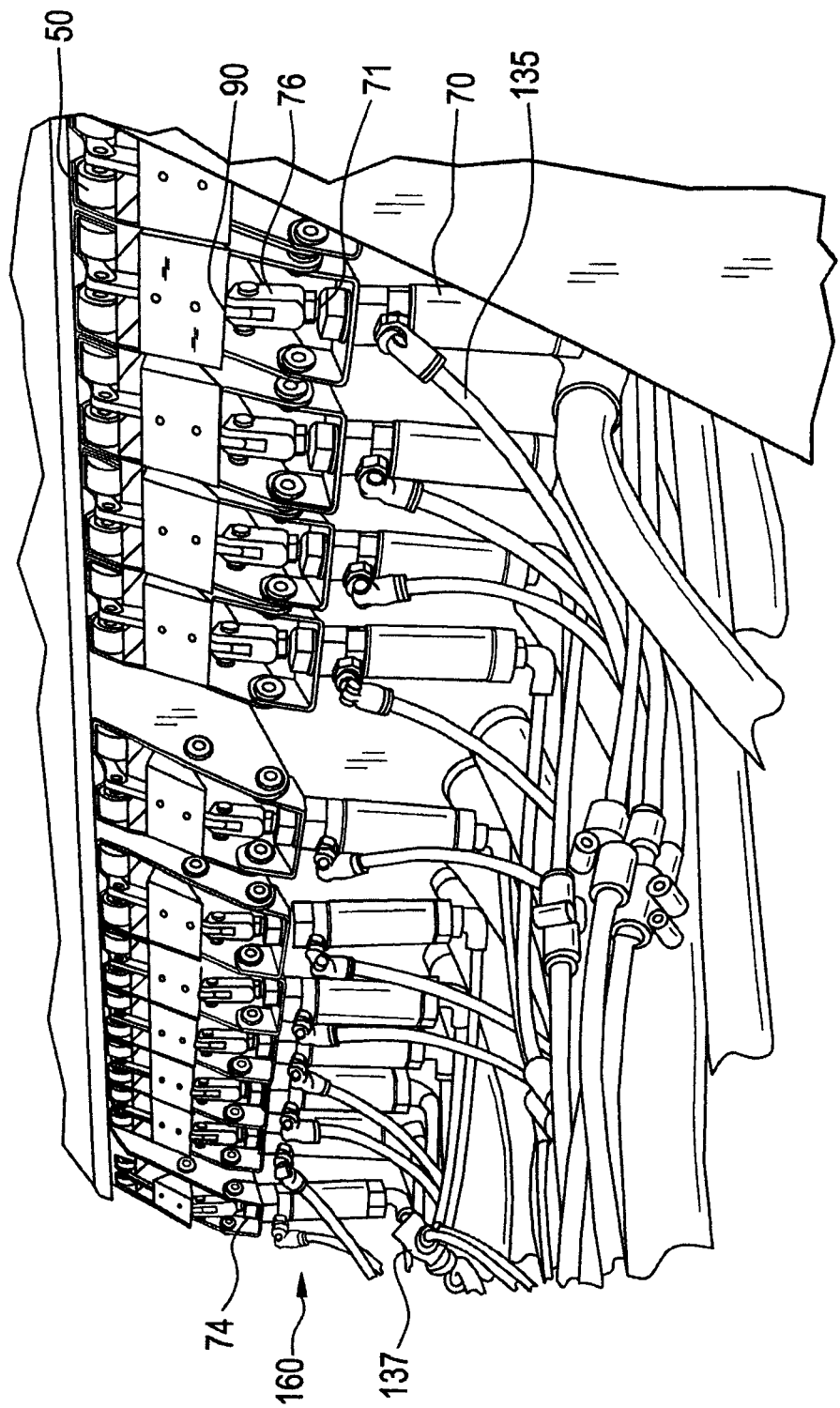
FIG. 14 is a front perspective view showing seed distribution tubes and the air tubes and drive cylinders for the seed metering doors for one half of the planter shown in FIG. 9.

FIG. 14 is a perspective view of the seed metering drive train partially showing seed distribution tubes and the air tubes and drive cylinders for the seed metering doors for one half of the planter shown in FIG. 9. An assembly 160 of air cylinders 70 is mounted on brackets 74. Air cylinders 70 drive piston rods 71 and links 90 to move nylon wheels 50 down or up in tracks. The wheels are on axles which extend through slots on door mounting lugs. The doors slide on tracks.

Figure 15:
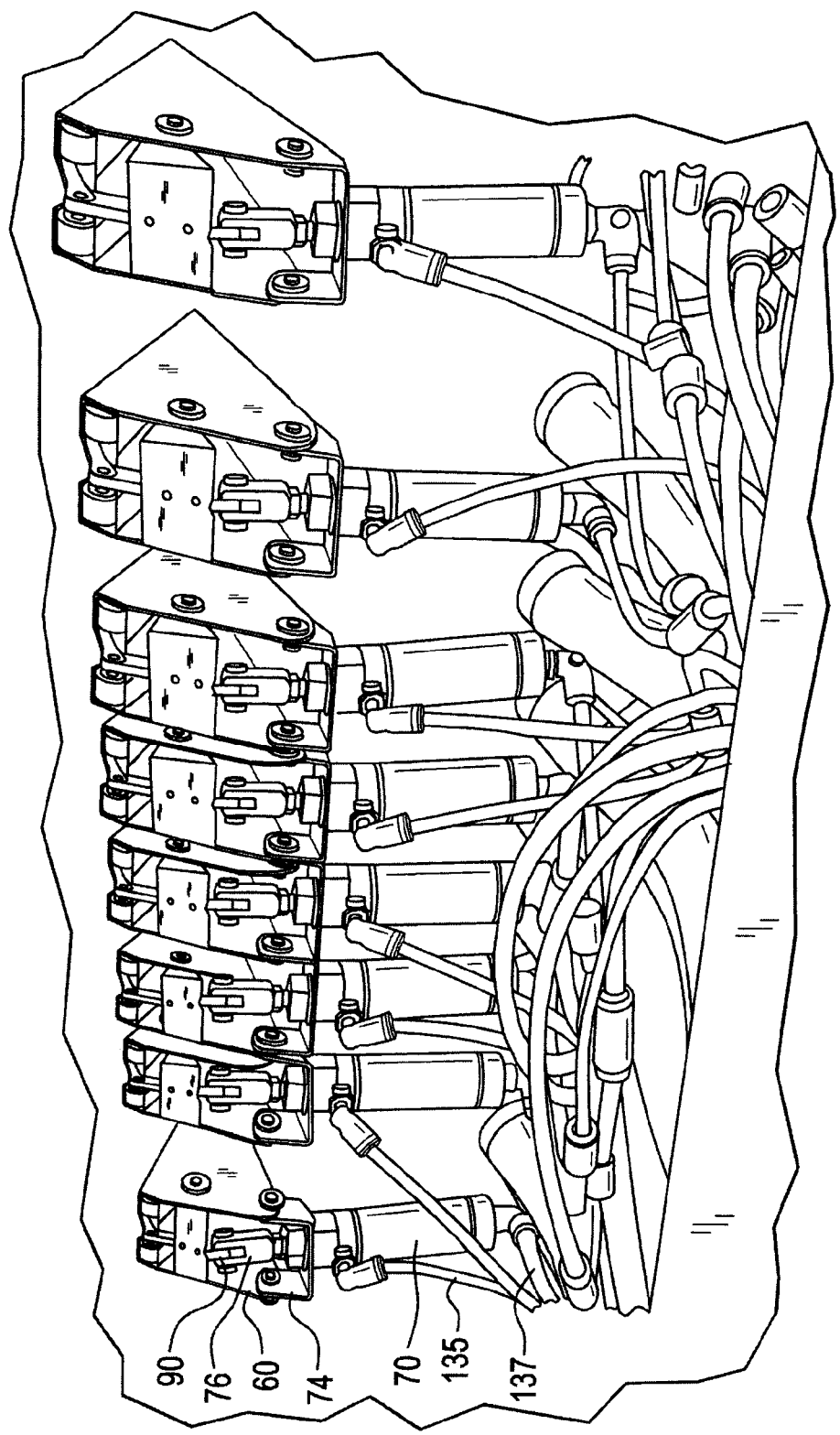
FIG. 15 is an enlarged view of part of one assembly of air cylinders for operating seed metering doors on the seed hopper leading to the seed distribution tubes.

FIG. 15 is an enlarged view of part of one assembly of air cylinders for operating seed metering doors on the seed hopper leading to the seed distribution tubes. Details of the air cylinders 70 show their connections to brackets 60. The devises 76 on upper ends of the piston rods 71 connect the rod ends to links 90.

Figure 16:
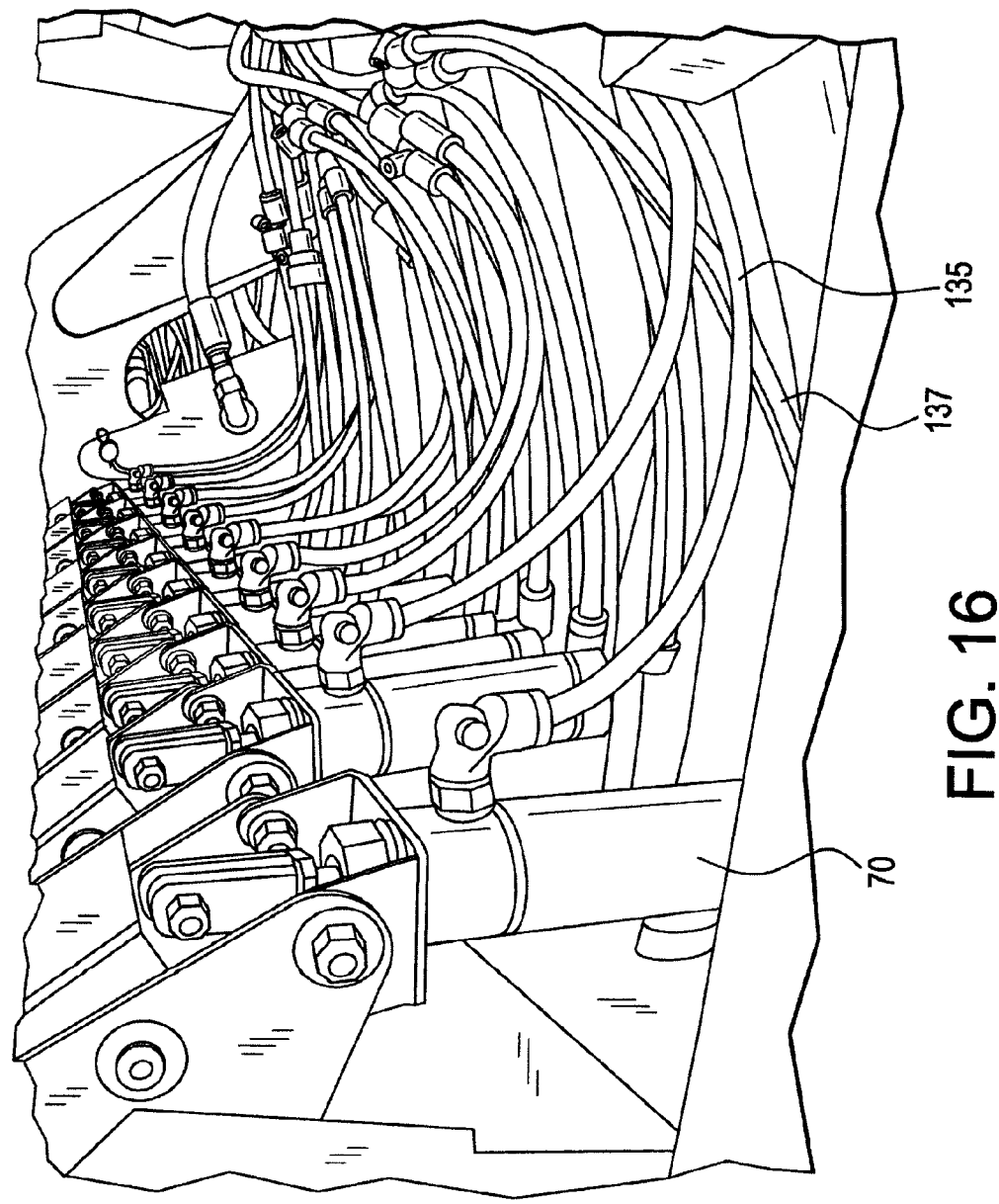
FIG. 16 is a side perspective view of the seed metering door driving air cylinders and cylinder pressurized air supply tubes in one assembly.

FIG. 16 is a side view of the seed metering door driving cylinders in one assembly.

Figure 17:
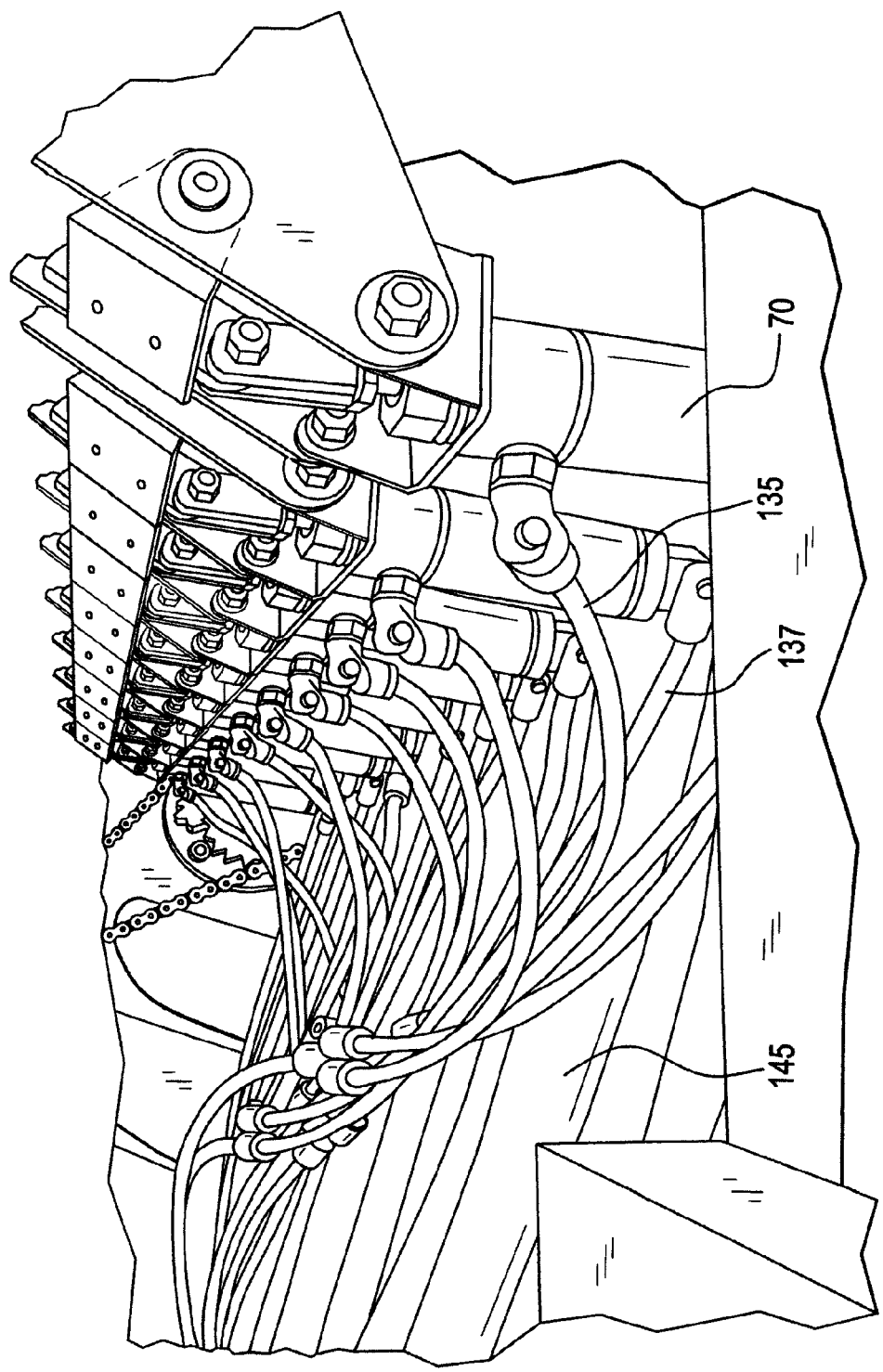
FIG. 17 is an opposite side perspective view of the seed metering door driving cylinders in one assembly shown in FIGS. 15 and 16.

FIG. 17 is an opposite side view of the seed metering door driving cylinders in one assembly shown in FIGS. 15 and 16.

While the invention has been described with reference to specific embodiments, modifications and variations of the invention may be constructed without departing from the scope of the invention, which is defined in the following claims.

I claim:

1. Apparatus comprising a seed planter having a seed storage bin, a seed trough connected to the seed storage bin for receiving seed therefrom, a seed door plate connected to the seed trough, multiple seed ports in the seed door plates, multiple seed gates connected to the seed door plate by the seed parts, seed door controller having actuators for selectively opening and closing the seed gates at the seed ports doors between a seed storage bin and seed meters, further comprising links between the seed gates and the actuators for moving the gates.

2. The apparatus of claim 1, wherein the seed gates are constrained for sliding and the actuators are double acting actuators adapted for sliding the gates along the seed door plate to open positions on the seed ports and sliding the gates to closed positions on the seed ports.

3. The apparatus of claim 2, wherein the gates slide in tracks on the seed door plate near the seed ports, further comprising a pressure source, solenoid valves connected to the pressure source, pressure lines connected to the solenoid valves and connected to opposite ends of the actuators and power lines connected to the solenoid valves for controlling positions of the solenoid valves.

4. Apparatus comprising a seed planter seed door controller having actuators for selectively opening and closing seed doors between a seed storage bin and seed meters, further comprising links between the seed doors and the actuators for moving the doors, wherein the doors are constrained for sliding and the actuators are double acting actuators adapted for sliding the doors to open positions and sliding the doors to closed positions, further comprising wheel tracks adjacent the doors and wheels connected to the doors and moving in the wheel tracks.

5. Apparatus comprising a seed planter seed door controller having actuators for selectively opening and closing seed doors between a seed storage bin and seed meters, further comprising links between the seed doors and the actuators for moving the doors, wherein the doors are constrained for sliding and the actuators are double acting actuators adapted for sliding the doors to open positions and sliding the doors to closed positions, wherein the actuators are double acting air cylinders having rams connected to the links, and further comprising a high pressure air compressor, a high pressure air tank connected to the compressor, high pressure supply air supply lines connected to solenoid operated air control valves and separate high pressure cylinder operating lines connected between each solenoid operated air control valve and opposite ends of one of the double acting air cylinders for driving the rams inward or outward for opening or closing the seed doors.

6. The apparatus of claim 5, wherein the driving the rams inward opens the seed doors and the driving the rams outward closes the seed doors.

7. The apparatus of claim 6, further comprising clamps for applying to the rams and adapted for limiting inward travel of the rams and thereby limiting openings of the seed doors for passing small seeds from the seed storage bin through the limited openings of the seed doors.

8. The apparatus of claim 5, further comprising a GPS locator for locating a position in a field, a microprocessor connected to the GPS locator, the microprocessor having an input and storage of dimensions of a field, planting areas, non-planting areas, and turning areas of the field and having an input of planting header distances from the GPS locator and time of travel of seeds from a seed door through seed distributors to seed planting headers and having an output for controlling application of power to the solenoid controlled valves for timely opening and closing the seed doors for delivering seed from the seed bin through open seed doors, the seed meters and the seed distributors to the seed planting headers when the headers are in a planting area and timely closing doors when approaching the non-planting areas and the turning areas, thereby avoiding over seed planting in turning areas and avoiding seed planting in non-planting areas.

9. Apparatus comprising a seed planter seed door controller having actuators for selectively opening and closing seed doors between a seed storage bin and seed meters, further comprising links between the seed doors and the actuators for moving the doors, wherein the seed bin has a front plate with seed openings and sliding seed doors for selectively closing and opening the seed openings in the front plate, legs attached to the front plate, guide roller channels connected to the legs, brackets connected to the guide roller channels, guide rollers mounted in the channels and connected to the seed doors, U-shaped trunion mounts hinged to the brackets, double acting cylinders connected to the U-shaped trunion mounts, rams connected to the cylinders, bell cranks connected to the rams and to the doors and pivotally mounted on the brackets for closing the seed doors as the rams are extended from the cylinders and opening the seed doors as the rams are withdrawn into the cylinders, fluid lines connected to opposite ends of the cylinders, solenoid control valves connected to the fluid lines, a fluid pressure source connected to the solenoid valves, and electric lines connected to the solenoid valves for controlling the solenoid valves and thereby controlling delivery of fluid pressure to opposite ends of the cylinders for opening or closing the seed doors.

10. The apparatus of claim 9, further comprising a GPS locator for locating a position in a field, a microprocessor connected to the GPS, the microprocessor having an input and storage of field dimensions, planting areas and non-planting areas, and turning areas of a field and having an input of planter header distances from the GPS located and length of travel of seeds from a seed door through seed distributors to seed planting headers and having an output connected for controlling the solenoid controlled valves for timely opening and closing seed doors for delivering seed from the seed bin through open seed doors, the seed meters and the seed distributors to the seed headers when the headers are in or are approaching a planting area and timely closing doors when approaching non-planted areas and turning areas, thereby avoiding double seed planting in turning areas and avoiding seed planting in non-planted areas.

11. A method comprising electronically controlling seed planting and preventing seed wastage and avoiding over planting and crop stunting comprising storing seed in a seed bin in a seed planter, opening doorways in a plate of the seed bin and depositing seed in seed meters, metering spaced seeds, depositing the spaced seeds in air distribution lines and propelling the spaced seeds to seed planting headers, closing the seed doors when approaching a non seeding area or a turning area of a field and opening the seed doors when approaching a seeding area, wherein the closing and opening the seed doors is by links and fluid actuating controlled by electronically controlling solenoid valves and thereby providing pressurized fluid to selected opposite ends of double acting actuators and timely electronically controlling the solenoid valves and supplying pressurized fluid to the actuators, and timely closing the seed doors before reaching the non-planting areas or turning areas and timely opening the seed doors before reaching the planting areas or before completing turns in the turning areas.

12. The method of claim 11, wherein the providing pressurized fluid comprises compressing air, storing compressed air and delivering the compressed air to the solenoid valves and where the fluid activating of the seed doors is by supplying the pressurized air to one or the other opposite ends of double acting air cylinders and extending rams from the air cylinders for closing the seed doors and withdrawing the rams into the air cylinders for opening the seed doors.

13. The method of claim 12, further comprising applying clips to the rams for limiting the withdrawing of the rams and limiting the opening of the seed doors.

14. The method of claim 12, wherein the opening and closing of the seed doors is provided by opening and closing adjacent seed doors in groups.

15. The method of claim 12, further comprising storing field dimensions and planting patterns in a microprocessor, providing a GPS locator, storing distance from the GPS locator to seed planting headers, storing distances of seed paths from the seed doors and the seed meters to the seed planting headers in a microprocessor, inputting in the microprocessor GPS locator position in the field relative to the stored field dimensions and planting patterns, and timely closing the seed doors to prevent delivery of seed to the seed paths before reaching non-planting areas, opening the seed doors while approaching the seed planting areas, and outputting electronic signals from the microprocessor for controlling the solenoid valves.

16. The method of claim 11, further comprising storing field dimensions and planting patterns in a microprocessor, providing a GPS locator, storing distance from the GPS locator to seed planting headers, storing distances of seed paths from the seed doors and the seed meters to the seed planting headers in a microprocessor, inputting in the microprocessor GPS locator position in the field relative to the stored field dimensions and planting patterns, and timely closing doors to prevent delivery of seed to the seed paths before reaching non-planting areas and turning areas and outputting electronic signals from the microprocessor for controlling the solenoid valves.

* * * * *